United States Patent Office 2,860,148
Patented Nov. 11, 1958

2,860,148

17α-METHYL-Δ$^{1,4}$-PREGNADIENE COMPOUNDS

Emanuel B. Hershberg, West Orange, N. J.

No Drawing. Application March 22, 1955
Serial No. 496,065

9 Claims. (Cl. 260—397.45)

This invention relates to a new group of compounds having important adrenocorticoid activity and to processes for preparing the same. More particularly, this invention relates to 17α-methyl-Δ$^{1,4}$-steroids which exhibit a marked enhancement of cortical activity.

The compounds of my invention may be represented by the following general formula:

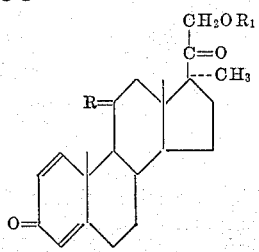

wherein R is a member of the group consisting of H, H; H, α-OH; H, β-OH; and O, and R$_1$ is a member of the group consisting of H and lower alkanoyl.

I have found that the compounds falling within the scope of the general formula are more potent than substances such as cortisone and compound F in that a prolonged duration of activity is observable when a comparable dose is employed. This marked enhancement of adrenocortical activity exhibited by the compounds of the general formula containing an oxygen function at C–11 is advantageous in therapy where cortisone or hydrocortisone is indicated. The prolonged duration of activity exhibited by the compounds of my invention allow for administration of smaller doses thereby eliminating many of the undesirable side effects which are known to occur in cortisone therapy. Furthermore, those compounds of the general formula which are devoid of a functional group at C–11, are useful as intermediates in the preparation of physiologically active substances. Some of the compounds which are devoid of a functional group at C–11 find further utility in mineralocortical therapy.

The compounds of my invention are conveniently prepared according to the following scheme wherein it is shown, that, in addition to heretofore described therapeutic uses, some of the compounds of my invention are in themselves useful intermediates in the preparation of physiologically active compounds:

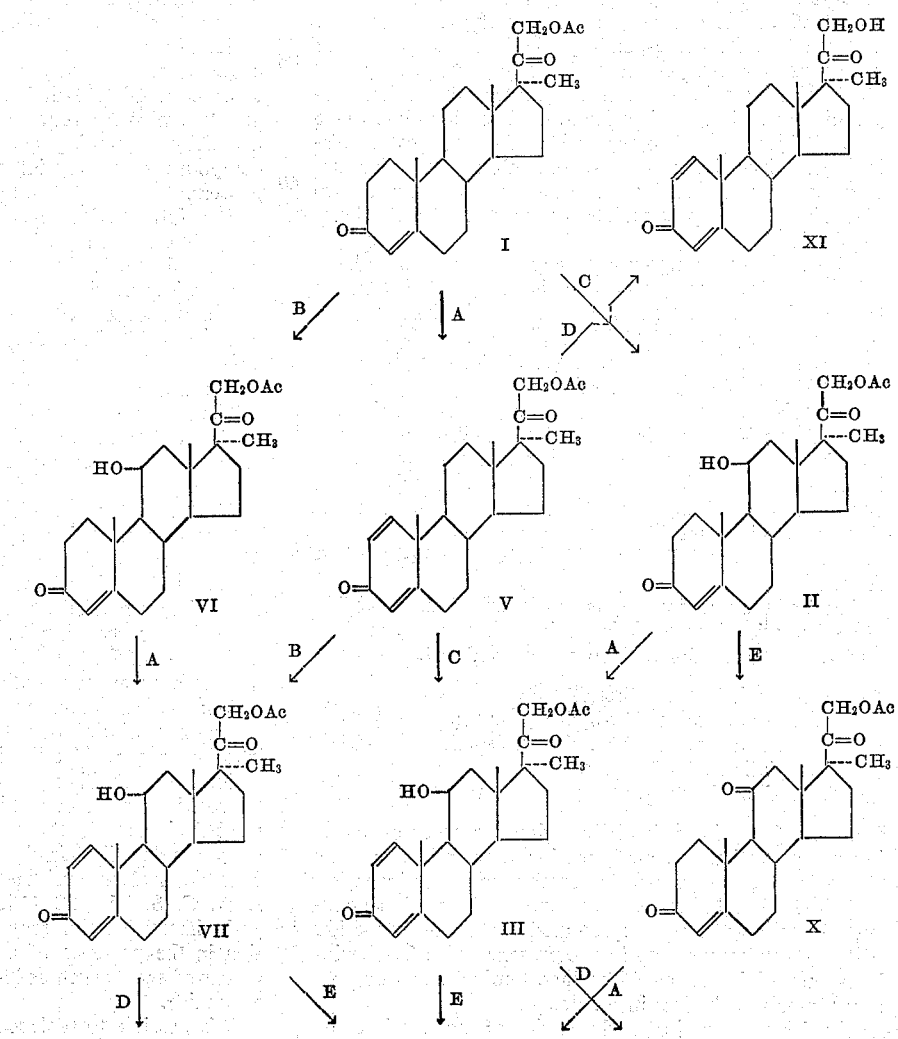

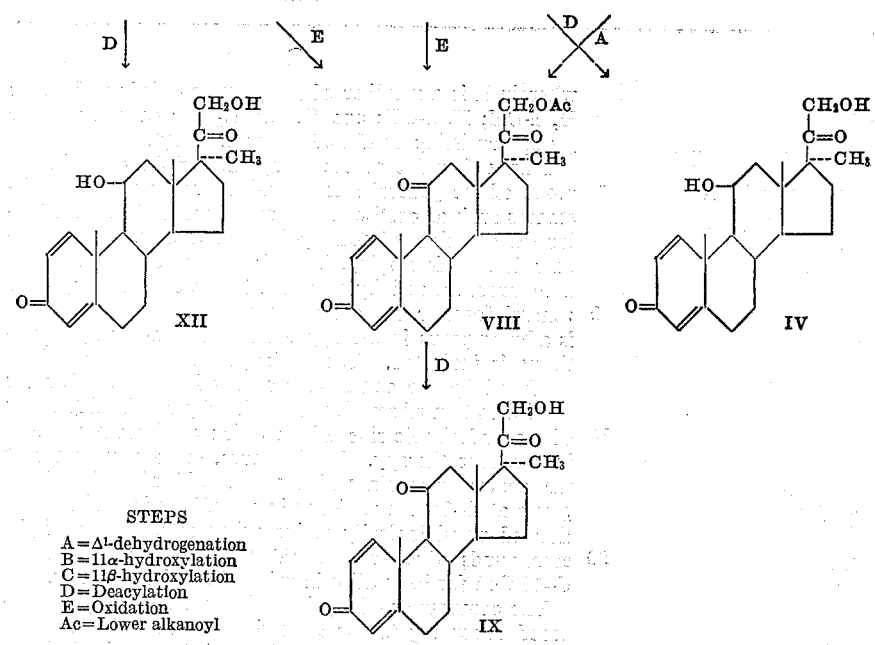

STEPS
A = Δ¹-dehydrogenation
B = 11α-hydroxylation
C = 11β-hydroxylation
D = Deacylation
E = Oxidation
Ac = Lower alkanoyl The starting material Δ⁴-pregnene-17α-methyl-3,20-dione 21-ol 21-acetate (I), prepared as described by Engel and Just, J. A. C. S. 76, 4909 (1954), may be subjected to either of three sequences of reactions which ultimately give rise to the compounds of this invention. More specifically, in one of the sequences compound I may be converted to its corresponding 11α-hydroxy analog VI by means of an oxygenating microorganism. Compound VI in turn may then be dehydrogenated with a dehydrogenating organism to give rise to the corresponding diene VII. Subjecting VII to the action of a chemical oxidizing agent gives rise to the 11-keto analog VIII which can then be deacetylated by a species of flavobacterium to give rise to Δ¹,⁴-pregnadiene-17α-methyl-3,11,20-trione-21-ol (IX).

Alternatively, compound I may be 11β-hydroxylated microbiologically to give rise to its 11β-hydroxy analog II which in turn can be converted to its Δ¹,⁴-diene III and further deacetylated at C-21 to give IV. It is obvious that compound III may be oxidized at C-11 to give compound VIII as shown in the scheme.

In addition, compound II may be oxidized to its 11-keto analog X which is convertible to VIII as shown. Finally, compound I may be converted to its corresponding Δ¹,⁴-diene V which upon 11α-hydroxylation yields VII (or upon 11β-hydroxylation yields III). From the reaction scheme it is seen that both compounds III and VII are convertible to VIII by oxidation of the 11-hydroxyl function.

In all of the reaction sequences described above and in the schematic diagram, it is obvious that there are four or five transformations which are carried out. Namely, (1) Introduction of a Δ¹ bond.
(2) Introduction of an 11α-hydroxyl group.
(3) Introduction of an 11β-hydroxyl group.
(4) Deacylation of a 21-ester.
(5) Oxidation of an 11-hydroxyl group to 11-keto.

From the foregoing it is obvious that the order of carrying out a particular transformation may follow another depending merely upon which compound of the invention is desired. Furthermore, compounds such as IV are convertible to compounds represented by IX by oxidation of the 11-hydroxy group in the presence of a 21-ol with N-bromsuccinimide or N-bromacetamide according to procedures well known in the art.

The dehydrogenation of the A ring of the steroid compound to introduce a Δ¹ double bond is accomplished by a dehydrogenating organism chosen from the family Corynebacteriaceae, and preferably of the genus Corynebacterium, of which C. simplex (A. T. T. C. 6946) and C. hoagii (A. T. T. C. 7005) are preferred. This dehydrogenating step is in accordance with the procedures described in the co-pending applications of Arthur Nobile, Serial No. 464,159, filed October 22, 1954; Serial No. 481,279, filed January 11, 1955; and the application of Eugene P. Oliveto and Hershel L. Herzog, Serial No. 489,282, filed February 18, 1955. As previously stated this dehydrogenating step can be applied to the starting compound or at any intermediate point in the complete process.

The introduction of an 11α-hydroxyl group at any point described in the foregoing series of transformations is effected preferably by the action of a culture or of the enzymatic material or extract of Rhizopus nigricans in the manner described in the U. S. patent to Murray et al., No. 2,602,769, dated July 8, 1952. Other 11α-hydroxylated organisms such as Aspergillus niger, Rhizopus arrhizus and the like may be used.

The introduction of the 11β-hydroxyl group is effected in the transformations shown preferably with a culture, or the seperated enzymatic material or extract of a culture, of Curvularia lunata as described in U. S. patent to Shull et al., No. 2,658,023, dated November 3, 1953. Other β-hydroxylating organisms such as Cunninghemella blakesleana and the like may also be used.

The hydrolysis of the C-21 ester to the C-21-ol is conveniently carried out according to the procedure described in co-pending application of William Charney, Serial No. 458,661, filed September 27, 1954, in which a culture or an enzymatic extract thereof of Flavobacterium dehydrogenans var. hydrolyticum is permitted to act upon a solution or a suspension of the steroidal ester whereupon saponification is effected.

Oxidation of either the 11α-hydroxyl group or the 11β-hydroxyl group is conveniently performed at any of the steps designated in the sequences by means of chemical processes described in the literature. For example, using chromic acid in pyridine as described by Poos et al., J. A. C. S. 75, 422 (1953). As previously stated an 11-hydroxyl function may be oxidized to an 11-keto function in the presence of a free C-21 hydroxyl group by means of agents such as N-bromsuccinimide and N-bromacetamide.

It is possible to replace the microbiological procedures described heretofore with chemical procedures, however, we prefer to employ microorganisms as described for in such a manner yields are generally increased with concomitant reduction in the production of undesirable side reactions.

The compounds of this invention are preferably administered parenterally in the form of therapeutically acceptable solutions or suspensions. Where oral administration is indicated, the substances may be easily compounded into tablets, elixirs and other common pharmaceutical dosage forms.

The following examples more fully describe the preparation of the compounds of this invention. However, they are presented for illustrative purposes only and in no way shall be construed as limiting the scope of this invention except as defined in the appended claims.

EXAMPLE 1

Preparation of $\Delta^4$-pregnene-17α-methyl-11β,21-diol-3,20-dione 21-acetate (II) from (I)

100 ml. of a 0.1% yeast extract concentrate including 9.0 ml. of 0.2 M $KH_2PO_4$ and 9.0 ml. of 0.2 M $Na_2HPO_4$ are sterilized in known manner and inoculated with a 1.0 suspension of Curvularia lunata (Q. M. 120h) from a 24-hour broth culture (see also U. S. Patent No. 2,658,023). The newly seeded culture is incubated and shaken on a shake table for 20 hours at 28° C. 100 ml. of this inoculum is added under sterile conditions to two liters of an aqueous medium containing the following:

| | |
|---|---|
| Sucrose | 1 |
| Difco tryptone | 1 |
| Sodium nitrate | 0.2 |
| Dipotassium hydrogen phosphate | 0.1 |
| Magnesium sulfate heptahydrate | 0.05 |
| Potassium chloride | 0.05 |
| Ferrous sulfate heptahydrate | 0.001 |

This mixture is adjusted to pH 7 with sulfuric acid and 0.25% of calcium carbonate is added before the mixture is sterilized. The inoculated medium is aerated at the rate of about one-half to one volume of air per volume of solution per minute at 27° to 28° C. for 24 hours. During this time, the mixture is agitated with a stirrer rotating at about 1700 revolutions per minute. One-half gram of $\Delta^4$-pregnene-17α-methyl-3,20-dione-21-ol 21-acetate (I) is dissolved in 20 ml. of 90% ethanol. The solution is added to the fermentation mixture under sterile conditions. The reaction is then continued for a further 24 hours under exactly the same conditions as described above.

The fermentation mixture is extracted thoroughly with three portions of methylene chloride and the combined extracts are dried over magnesium sulfate and concentrated to a small volume. The concentrated solution is added to a Florisil column (30 g.) prepared with hexane and the column is stripped with hexane containing ether in amounts varying upward from 1% to 99%. The desired product is collected from the most polar eluates (25% ether→99% ether) and is crystallized from acetone-hexane, affording crystalline $\Delta^4$-pregnene-17α-methyl-11β, 21-diol-3,20-dione 21-acetate (II).

EXAMPLE 2

Preparation of $\Delta^{1,4}$-pregnadiene-17α-methyl-3,20-dione-21-ol 21-acetate (V) from (I)

100 ml. of a 0.1% yeast extract concentrate including 9.0 ml. of 0.2 M $KH_2PO_4$ and 9.0 ml. of 0.2 M $Na_2HPO_4$ are sterilized in known manner and inoculated with a 1.0% suspension of Corynebacterium simplex (A. T. C. C. 6946) from a 24-hour broth culture. The newly seeded culture is incubated and shaken on a shake table for 20 hours at 28° C. After incubation, the broth culture is transferred aseptically to a second sterile 300 ml. Erlenmyer flask containing 150.0 mg. of sterile 4-pregnene-17α-methyl-3,20-dione-21-ol 21-acetate in 5.0 ml. ethanol. The pH of the reaction mixture is 7.0. The bacterial culture containing the steroid and solvent is incubated and shaken for a period of 48 hours at 28° C. The final pH of the reaction mixture is 7.2–7.4. The culture is then extracted thoroughly with three portions of chloroform. The extracts are pooled and concentrated on a steam bath to dryness. The crude extract weighs 178 mg.

The crude product is crystallized from acetone-hexane, yielding pure crystals of $\Delta^{1,4}$-pregnadiene-17α-methyl-3,20-dione-21-ol 21-acetate (V).

EXAMPLE 3

Preparation of $\Delta^4$-pregnene-17α-methyl-11α,21-diol-3,20-dione 21-acetate (VI) from (I)

This conversion is effected with the aid of a culture Rhizopus nigricans in the manner described in detail in J. A. C. S. 74, 5933 (1952). To 6 liters of a 24-hour growth culture of Rhizopus nigricans is added 1.0 g. of $\Delta^4$-pregnene-17α-methyl-3,20-dione-21-ol 21-acetate in 200 ml. of ethanol. After a 48-hour transformation period in the equipment and medium described in the just-mentioned publication, the culture is extracted with methylene chloride, the solvent evaporated, and the crude crystalline residue is recrystallized from acetone-hexane, affording crystalline $\Delta^4$-pregnene-17α-methyl-11α,21-diol-3,20-dione 21-acetate (VI).

EXAMPLE 4

A. Preparation of $\Delta^{1,4}$-pregnadiene-17α-methyl-11β,21-diol-3,20-dione 21-acetate (III) from (II)

By substituting an equivalent quantity of $\Delta^4$-pregnene-17α-methyl-11β,21-diol-3,20-dione (II) for the $\Delta^4$-pregnene-17α-methyl-3,20-dione-21-ol 21-acetate (I) in the procedure described in Example 2, there is obtained $\Delta^{1,4}$-pregnadiene-17α-methyl-11β,21-diol-3,20 - dione 21-acetate (III) as a white crystalline solid.

B. From V

Compound V obtained as described in Example 2 upon 11β hydroxylation according to the procedure of Example 1 gives rise to the diene-diol-dione acetate of this example.

EXAMPLE 5

A. Preparation of $\Delta^{1,4}$-pregnadiene-17α-methyl-11α,21-diol-3,20-dione 21-acetate (VII) from (V)

Upon subjecting $\Delta^{1,4}$ - pregnadiene - 17α - methyl-3,20-dione-21-ol 21-acetate to the hydroxylating action of Rhizopus nigricans according to the procedure described in Example 2, there is obtained $\Delta^{1,4}$-pregnadiene-17α-methyl-11α,21-diol-3,20-dione 21-acetate (VII) which is recrystallized from acetone-hexane.

B. From VI

Dehydrogenating $\Delta^4$-pregnene-17α-methyl-11α,21-diol-3,20-dione 21-acetate (VI) by means of Corynebacterium simplex according to the procedure described in Example 3 affords upon recrystallization, the diene-diol-dione acetate of this example.

EXAMPLE 6

Preparation of $\Delta^4$-pregnene-17α-methyl-3,11,20-trione-21-ol 21-acetate (X) from (II)

A solution of 3.0 g. of $\Delta^4$-pregnene-17α-methyl-11β, 21-diol-3,20-dione 21-acetate (II) in 30 ml. of pyridine is added slowly to a slurry of 1.5 g. of chromic acid in 15 ml. of pyridine (Poos et al., J. A. C. S. 75, 422 (1953)) and the resulting mixture is stirred overnight at room temperature. To the reaction are then added 4.5 g. of sodium sulfite in 45 ml. of water and stirring is continued for two hours. The reaction mixture is poured into 600 ml. of water and the resulting solution is extracted with methylene chloride. The extracts are washed neutral with dilute sulfuric acid, aqueous sodium carbonate and water, and dried over magnesium sulfate. Concentration of the dried solution and crystallization of the residue from acetone-hexane affords crystalline $\Delta^4$-pregnene-17α-methyl-3,11,20-trione-21-ol 21-acetate (X).

EXAMPLE 7

A. *Preparation of $\Delta^{1,4}$-pregnadiene-17α-methyl-3,11,20-trione-21-ol 21-acetate (VIII) from (III)*

Oxidizing an equivalent quantity of $\Delta^{1,4}$-pregnadiene-17α-methyl-11β,21-diol-3,20-dione 21-acetate (III) with chromic acid in pyridine according to the procedure described in Example VI affords crystalline $\Delta^{1,4}$-pregnadiene-17α-methyl-3,11,20-trione-21-ol 21-acetate (VIII) after recrystallization from acetone-hexane.

B. *From VII*

In a manner identical to that described from the oxidation of the 11β-hydroxy compound (III) in Part A of this example, there is obtained the diene-trione-ol acetate of this example from $\Delta^{1,4}$-pregnadiene-17α-methyl-11α-21-diol-3,20-dione 21-acetate (VII).

C. *From X*

The introduction of the diene system in compound X obtained in Example 6 is carried out microbiologically essentially as described in the procedure of Example 2.

EXAMPLE 8

*Preparation of $\Delta^{1,4}$-pregnadiene-17α-methyl-11β,21-diol-3,20-dione (IV) from (III)*

100 ml. of a growth medium having the following composition are used in each of four 300 ml. flasks:

| | G. |
|---|---|
| Yeast extract (Difco) | 10 |
| Potassium phosphate monobasic | 4.48 |
| Sodium phosphate dibasic | 4.68 |
| Tap water to 1 liter. | |

The flasks are inoculated with a culture of *Flavobacterium dehydrogenans* var. *hydrolyticum* according to the methods described in co-pending application of William Charney, Serial No. 458,661, filed September 27, 1954. The inoculated flasks are placed on a shaking machine in an incubator and kept at 30° C. at all times maintaining the shake cultures under continuous illumination.

Twelve to twenty-four hours after inoculation, about 200 mg. of $\Delta^{1,4}$-pregnadiene-17α-methyl-11β,21-diol-3,20-dione 21-acetate (III) dissolved in 5 ml. of ethanol is added to each flask. The pH in each of the several flasks is 7.0–7.2.

(Alternatively, the steroid may be added to an empty flask and sterilized by autoclaving, then dissolved by the addition of a small volume of ethanol and a broth culture, which has previously been incubated for 12 to 24 hours, is then poured in. Throughout these operations the fermentation mixture is maintained under sterile conditions.)

The mixture is then shaken for an additional 1 to 3 days at a temperature of about 30° C. with the final pH being 7.2–7.8.

The contents of the flasks are combined and extracted several times with methylene chloride using an equal volume of solvent for each extraction. The combined extracts are dried over anhydrous sodium sulfate, filtered, and the solvent is removed in vacuo. The resultant semi-crystalline residue is triturated with hexane. After decantation of the hexane, the crystalline material remaining is recrystallized affording $\Delta^{1,4}$-pregnadiene-17α-methyl-11β,21-diol-3,20-dione (IV).

EXAMPLE 9

*Preparation of $\Delta^{1,4}$-pregnadiene-17α-methyl-3,11,20-trione-21-ol (IX) from (VIII)*

By substituting the 21-acetate VIII to the saponifying action of *Flavobacterium dehydrogenans* var. *hydrolyticum* as described in Example 8, $\Delta^{1,4}$-pregnadiene-17α-methyl-3,11,20-trione-21-ol is obtained as a crystalline solid.

EXAMPLE 10

*Preparation of $\Delta^{1,4}$-pregnadiene-17α-methyl-11β,21-diol-3,20-dione 21-propionate*

The reaction of 1.0 g. of $\Delta^{1,4}$-pregnadiene-17α-methyl-11β,21-diol-3,20-dione (IV) in 5 ml. of pyridine and an equivalent quantity of propionic anhydride according to known procedures affords $\Delta^{1,4}$-pregnadiene-17α-methyl-11β,21-diol-3,20-dione 21-propionate.

EXAMPLE 11

*Preparation of $\Delta^{1,4}$-pregnadiene-17α-methyl-3,11,20-trione-21-ol 21-propionate*

By substituting $\Delta^{1,4}$-pregnadiene-17α-methyl-3,11,20-trione-21-ol (IX) in the procedure described in Example X, there is obtained the 21-ester of this example which is purified by recrystallization from acetone-hexane.

EXAMPLE 12

*Preparation of $\Delta^{1,4}$-pregnadiene-17α-methyl-3,20-dione-21-ol (XI) from (V)*

By substituting the 21-acetate V to the saponifying action of *Flavobacterium dehydrogenans* var. *hydrolyticum* as described in Example 8, $\Delta^{1,4}$-pregnadiene-17α-methyl-3,20-dione-21-ol (XI) is obtained as a crystalline solid.

EXAMPLE 13

*Preparation of $\Delta^{1,4}$-pregnadiene-17α-methyl-11α,21-diol-3,20-dione (XII) from (VII)*

By substituting the 21-acetate VII to the saponifying action described in Example 8, there is obtained $\Delta^{1,4}$-pregnadiene-17α-methyl-11α,21-diol-3,20-dione (XII) in crystalline form.

I claim:

1. Steroids of the formula

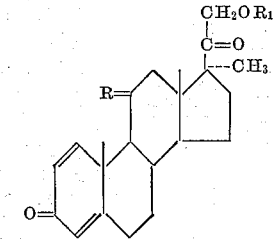

wherein R is a member of the group consisting of H, H; H, α—OH; H, β—OH; and O, and $R_1$ is a member of the group consisting of H and lower alkanoyl.

2. $\Delta^{1,4}$-pregnadiene-17α-methyl-11β,21-diol-3,20-dione 21-acetate.

3. $\Delta^{1,4}$-pregnadiene-17α-methyl-11α,21-diol-3,20-dione 21-acetate.

4. $\Delta^{1,4}$-pregnadiene-17α-methyl-3,11,20-trione-21-ol 21-acetate.

5. $\Delta^{1,4}$-pregnadiene-17α-methyl-11β,21-diol-3,20-dione.

6. $\Delta^{1,4}$-pregnadiene-17α-methyl-3,11,20-trione-21-ol.

7. 21-lower alkanoyl esters of $\Delta^{1,4}$-pregnadiene-17α-methyl-11β,21-diol-3,20-dione.

8. 21-lower alkanoyl esters of $\Delta^{1,4}$-pregnadiene-17α-methyl-11α,21-diol-3,20-dione.

9. 21-lower alkanoyl esters of $\Delta^{1,4}$-pregnadiene-17α-methyl-3,11,20-trione-21-ol.

References Cited in the file of this patent

UNITED STATES PATENTS

| 2,601,168 | Plattner | June 17, 1952 |
| 2,649,402 | Murray | Aug. 18, 1953 |

(Other references on following page)

UNITED STATES PATENTS

| | | |
|---|---|---|
| 2,656,366 | Minlon | Oct. 20, 1953 |
| 2,658,023 | Skull | Nov. 3, 1953 |
| 2,691,030 | Murray | Oct. 5, 1954 |
| 2,705,237 | Djerassi et al. | Mar. 29, 1955 |
| 2,789,118 | Bernsters et al. | Apr. 16, 1957 |

FOREIGN PATENTS

| | | |
|---|---|---|
| 171,176 | Austria | Oct. 15, 1951 |
| 765,509 | Great Britain | Jan. 9, 1957 |
| 1,013,729 | France | May 7, 1952 |
| 942,926 | Germany | May 9, 1956 |
| 71,268 | Netherlands | Nov. 15, 1952 |
| 298,333 | Switzerland | Apr. 30, 1954 |

OTHER REFERENCES

Chemical and Enginering News, vol. 32, #27, pages 2687–8 (July 5, 1954).